Jan. 14, 1941.  F. T. O'GRADY  2,228,479
COLOR PHOTOGRAPHY APPARATUS
Filed June 14, 1939
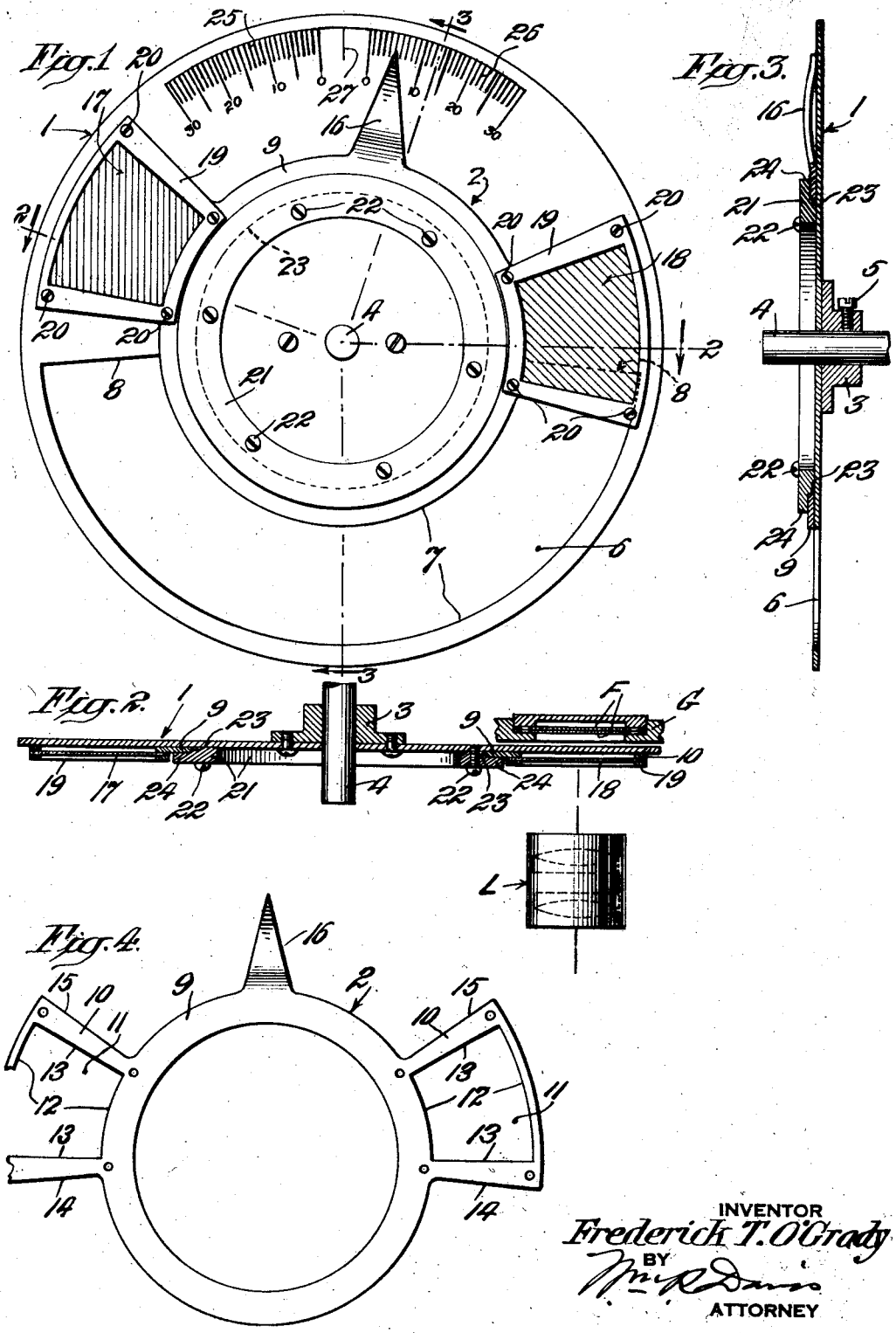
INVENTOR
Frederick T. O'Grady
BY
ATTORNEY Patented Jan. 14, 1941

2,228,479

UNITED STATES PATENT OFFICE 2,228,479

COLOR PHOTOGRAPHY APPARATUS

Frederick T. O'Grady, Flushing, N. Y.

Application June 14, 1939, Serial No. 279,083

14 Claims. (Cl. 88—19.3)

The present invention relates more particularly to improved means for carrying out a method of color correction in color motion picture photography, disclosed in my co-pending U. S. patent application Serial No. 243,069, filed November 30, 1938.

It is common knowledge to those skilled in the art of color photography that the color-sensitive negative emulsions used in the recording of color selective negative images invariably differ in their sensitiveness to various colors. For example, emulsions prepared for recording orange-red may be more sensitive than those prepared for recording only blue and green. It is also well known that varying lighting conditions cause inequalities in the different negative color recordings. Consequently, final, positive color reproductions are commonly found to be unnatural in tone due to predominance of one color or another. If the negative emulsion for recording orange-red be more sensitive than that for recording blue-green or if the light source be predominately red, then an excess reproduction of red will occur upon the color positive. Likewise, excess reproduction of green or blue will occur upon the respective color positive should the blue-green sensitive negative be more sensitive than the red or should the light source be predominantly green. Faithful reproduction of objects or scenes photographed can be obtained only when the color-selective negative exposures are of equal density.

My aforesaid copending application discloses an improved method of obtaining color balance in the exposure of bipack, tripack or screen-color negatives. In said method it is proposed, when color correction is needed, to insert a narrow strip of transparent color filter material within the opening or exposure aperture of a rotary camera shutter so that light rays passing through the camera lens will be momentarily affected by the color of the strip. For example, should it be found upon an exposure test, that the orange-red sensitive negative is receiving a more dense recording than the blue-green sensitive negative a green filter strip is inserted within the shutter opening. Since green is complementary to red, the passage of red image-bearing light rays will be momentarily blocked by the filter during the exposure period. At the same time, the green filter will permit the passage of green image-bearing rays to the respective negative prepared for recording green. If, on the other hand, it is found that green is being excessively recorded upon the green-sensitive negative a red filter strip is inserted in the shutter opening. This red filter will momentarily block the passage of green image-bearing rays without obstructing the passage of red image-bearing rays to the red-sensitive negative.

The width of the said filter strip is gauged according to the degree of color correction indicated as required by preliminary exposure tests. This gauging of the strip width for obtaining accurate color balance is sometimes a difficult and delicate operation. Furthermore during the course of filming a lengthy motion picture in natural color, varying lighting conditions make it desirable to change the balancing filter to meet the changes in quality of light. For instance, between morning and afternoon, there is a decided change in the quality of sunlight. In addition to that, one batch of film emulsion used in making a color motion picture may prove to be over-sensitive to one color while the next batch may be over-sensitive to a color complementary to the first. It is most desirable that adjustment of the filter strips to meet these different conditions be facilitated, and an important object of the present invention is to provide means for quickly, conveniently and accurately adjusting the filters for color-balancing.

Other objects of the invention will appear hereinafter.

In the drawing, Fig. 1 is a face view of a combined shutter and color filter device embodying the invention;

Fig. 2 is a section on the line 2—2 of Fig. 1 showing the device associated with the lens assembly and film gate of a motion picture camera;

Fig. 3 is a section on the line 3—3 of Fig. 1; and

Fig. 4 is a face view of the filter-carrying disk detached from the shutter disk.

The structure of the combined camera shutter and color filter device includes a shutter disk 1 and a carrier disk 2 for the color-balancing filters at the forward face of disk 1. Both of these disks are made of metal. A hub member 3 is secured to the rear face of the shutter disk and has a bore registering with a central hole in the disk to receive a supporting shaft 4 driven by the usual shutter-driving means, not shown. A set screw 5 is borne by the hub member to secure the shutter to the shaft for rotation therewith. The shutter disk has an opening, or exposure aperture 6 extending around the axis of the shutter and defined by concentric edges 7 and radial edges 8. The aperture may however be a gap in the shutter. It may also be covered by a transparent panel instead of left open as shown. The term "exposure aperture" occurring in the claims is therefore to be construed broadly enough to cover said alternatives. In the present instance the effective shutter area includes one hundred and ninety degrees around the axis and the opening 6 includes one hundred and seventy degrees.

The filter carrier 2 includes a flat, annular body portion 9 integrally formed with flat segmental frames 10 extending radially outward in opposite directions. Each of said frames defines an aperture 11 defined by concentric arcuate edges 12 and radial edges 13. The radial edges 13 include, in the present instance, an angle of thirty degrees around the center of the carrier and the radial width of the aperture is approximately equal to that of the shutter aperture 6. The apertures 6 and 11 are all the same radial distance from the center of the device. Outer radial edges 14 of the frames 10 are spaced at least one hundred and seventy degrees around the center. Midway between opposite radial outer edges 15 of said frames the body of the carrier is integrally formed with a pointer 16 extending radially outward. The aperture of one of the frames 10 is covered by an orange-red color filter 17 and the aperture of the other filter is covered by a blue-green color filter 18. Each filter is formed of a transparent sheet of Celluloid or other suitable material cut to conform to the outer contour of the frame. Each filter is clamped in place upon its frame by an outer frame 19 conforming in shape to the frame 10 and secured thereto by screws 20. The apertures of the frames 19 register exactly with those of the frames 10.

The filter carrier 2 is mounted at the forward face of the shutter disk 1 for rotative adjustment thereon about the axis of rotation of the shutter. Its mounting includes a flat annulus 21 detachably secured to the forward face of the shutter by screws 22 and centered on the shutter. The peripheral margin of said annulus is cut away adjacent the shutter to form a journal 23 for the filter carrier fitting in the central aperture of the latter, and a circular retaining flange 24 holding the carrier to the forward face of the shutter. Thereby the filter carrier is rotatively supported on the shutter for adjustment around the shutter axis to dispose either filter varying degrees across the exposure aperture of the shutter or to dispose both filters in inoperative position out of register with the exposure aperture. In order to hold the carrier in its different adjustments the pointer 16 is bowed outward and made to serve as a leaf spring with its outer end exerting a constant pressure upon the forward face of the shutter. The spring action of the pointer tends to cant the carrier within the cutout of the annulus 21 and thus causes the carrier to be frictionally held in any of its adjustments and to rotate with the shutter without relative displacement.

Two protractor scales 25 and 26 are borne by the shutter for cooperation with the pointer 16. These scales are graduated in opposite directions from zero to thirty degrees. The scales are spaced apart around the axis of the shutter and, midway between their zero marks, the shutter bears a mark 27. This mark is so located that when the pointer 16 is in register with it both of the color filters and their frames are disposed entirely out of register with the shutter aperture. The graduations of the scales and the mark 27 are engraved upon the shutter and form notches into which the extremity of the pointer may snap to assist in holding the filter carrier accurately in adjusted position.

The combined shutter and filter device is, in use, disposed back of the lens unit L of a motion picture camera and directly in front of a film gate G, as indicated in Fig. 2. The film gate is shown as supporting a pair of bipack films F (shown in cross section) in position for simultaneous exposure to rays passing through the lens unit and through the shutter aperture 6 when the exposure period occurs. The forward film will bear an emulsion sensitive to blue-green image-bearing rays and the rear film will bear the emulsion sensitive to orange-red image-bearing rays. Between the films there will be the usual thin red light filter. If it be found upon preliminary test exposures that the negative color records upon the two films are off-balance correction is readily made as follows:

If the red color exposure, upon the rear film, be found to predominate the filter carrier 2 is adjusted upon the shutter clockwise with reference to Fig. 1. Movement of the pointer 16 from the mark 27 to the zero of scale 26 merely moves the lower side of the frame of the blue-green filter 18 into register with the shutter opening 6. Further clockwise movement of the pointer disposes the filter 18 across the adjacent end portion of the shutter opening and it is adjusted thereacross to a degree deemed necessary for obstruction of sufficient red rays to obtain color balance of the exposures upon the two films. The filter 18 being of a color complementary to that recorded upon the rear film it reduces the exposure thereon. At the same time, the filter permits the passage of blue-green rays for substantially undiminished exposure upon the forward film. If, on the other hand, the preliminary exposure tests reveal that the blue-green negative recording upon the forward film predominates, the filter carrier is adjusted counter-clockwise. The preliminary adjustment of the pointer 16 leftward from the mark 27 merely moves the lower portion of the frame of the orange-red filter into register with the shutter opening. Further movement disposes the filter across the adjacent end portion of the shutter opening and it is adjusted thereacross to a degree deemed necessary for obstructing sufficient of the blue-green rays to reduce the complementary color exposure upon the forward film to a parity with the color exposure upon the rear film. As the color of the filter 17 corresponds to that recordable upon the forward film the color exposure upon the latter will be substantially undiminished by the filter.

In the filming of a long color motion picture the exposures are sometimes taken alternately under daylight and artificial lighting conditions. Sometimes also the exposures are taken under a combination of sunlight and artificial light. My color-balancing device is readily adjustable to accommodate such changes in lighting conditions and maintain a balance in the color exposures. The device is also readily adjustable for the taking of black and white pictures. By merely moving the pointer 16 into register with the mark 27 the color filters are disposed in inoperative position entirely out of register with the shutter opening. The camera is then ready for recording black and white pictures in the usual way without any interference or any necessity for removing the filters from the camera.

It will be seen that my invention provides simple and satisfactory means designed to greatly facilitate the obtaining of balanced color exposures. While the invention has been described and shown as employed in the exposure of bipack films it may be employed satisfactorily in other film arrangements and exposure methods wherein a plurality of color exposures are made simultaneously by a single light flux.

What I claim is:

1. A rotary camera shutter having an exposure aperture, a pair of color filters one of a color complementary to the color of the other, for the purpose set forth, a carrier for said filters rotatable with the shutter and supporting the filters in a fixed spaced relation around the axis of rotation of the shutter a distance at least equal to the width of said exposure aperture around said axis, means supporting said carrier for rotative adjustment about said axis and relatively to the shutter to adjust either filter varying degrees across the exposure aperture and dispose the other filter in inoperative position out of register with the exposure aperture, or to dispose both filters in inoperative position out of register with the exposure aperture, and means to indicate the degree of rotative adjustment of said filter carrier, the width of each filter around said axis being materially less than the width of the exposure aperture around the axis, whereby the filter will intercept the exposure light flux during only a portion of the exposure period.

2. A rotary camera shutter having an exposure aperture, a pair of color filters one of a color complementary to the color of the other, for the purpose set forth, a carrier for said filters rotatable with the shutter and supporting the filters in a fixed spaced relation around the axis of rotation of the shutter a distance at least equal to the width of said exposure aperture around said axis, and means supporting said carrier for rotative adjustment about said axis and relatively to the shutter to adjust either filter varying degrees across the exposure aperture and dispose the other filter in inoperative position out of register with the exposure aperture, or to dispose both filters in inoperative position out of register with the exposure aperture.

3. A rotary camera shutter having an exposure aperture, a pair of color filters, a carrier for said filters rotatable with the shutter and supporting the filters in a fixed spaced relation around the axis of rotation of the shutter, and means supporting said carrier for rotative adjustment about said axis and relatively to the shutter to adjust either filter varying degrees across the exposure aperture and dispose the other filter in inoperative position out of register with the exposure aperture.

4. A combined shutter and light-filtering device for a camera, comprising a rotary shutter disk having an exposure aperture, a pair of color-balancing light filters one of a color complementary to that of the other, for the purpose set forth, a carrier disk for said filters rotatable with the shutter and supporting the filters spaced apart around the axis of rotation of the shutter disk a distance equal to at least the width of said exposure aperture around said axis, means supporting said carrier disk on the shutter disk for rotative adjustment around the axis of the latter to dispose either filter varying degrees across the exposure aperture and the other filter out of register with the aperture, or to dispose both filters out of register with the aperture, means to frictionally hold the carrier disk in its different adjustments relatively to the shutter disk, and cooperating means borne by said disks to indicate the degree of adjustment of either filter across the exposure aperture, the width of each filter around said axis being materially less than the width of the aperture, whereby the filter will intercept the exposure light flux during only a portion of the exposure period.

5. A rotary camera shutter having an exposure aperture, a color filter, a carrier for said filter rotatable with the shutter, means supporting said carrier on the shutter for rotative adjustment about the axis of rotation of the shutter to dispose the filter varying degrees across the exposure aperture, a scale borne by the shutter and extending around said axis, and a pointer borne by said carrier and cooperable with said scale to indicate the degree of adjustment of the filter across the exposure aperture, said pointer being in the form of a spring finger to bear against the shutter to frictionally hold said carrier in its adjustments relatively to the shutter.

6. Color photography apparatus comprising means for supporting a plurality of negative bases for simultaneous exposure to a single light flux to record one color of a scene upon one base and a complementary color of the scene upon another base, a rotary shutter operable to intercept said light flux and having an exposure aperture, a pair of color-balancing light filters one of a color complementary to that of the other, a carrier for said filters supporting them in a spaced relation about the axis of rotation of the shutter, and means supporting said filter carrier for rotative adjustment about said shutter axis and relatively to the shutter to dispose either filter varying degrees across the exposure aperture of the shutter, for the purpose set forth.

7. A color balancing shutter for a camera for use in simultaneously photographing on a plurality of color sensitive films, comprising a rotary shutter formed with an arcuate exposure aperture, a pair of color filters for selective color balancing, one of a color complementary to the color of the other, and means supporting said filters for rotation with the shutter one at each end of the exposure aperture, and for individual adjustment about the axis of the shutter to dispose either filter to overlap its adjacent end of the exposure aperture to a limited extent, each filter being of a width around said axis materially less than the width of the exposure aperture, whereby a filter when adjusted over one end of the exposure aperture will intercept the exposure light flux during only a portion of the exposure period and the effective portion of the filter will effect the selected color balance on the exposed color sensitive films.

8. A color balancing shutter for a camera, according to claim 7, means being provided to accurately gage the extent of the lap of the effective color filter over the end of the exposure aperture to there accurately adjust the color balance.

9. A color balancing shutter for a camera for use in simultaneously making a plurality of color exposures by a single light flux on a plurality of color-sensitive films, comprising a rotary shutter formed with an arcuate exposure aperture, a pair of filters for selective color balancing, one of a color complementary to the color of the other, and means supporting said filters for rotation with the shutter and for individual and variable adjustment about the axis of rotation of the shutter and relatively to the shutter to dispose across the exposure aperture to the necessary extent that filter which in color is complementary to the color it is desired to obstruct, each filter being of a width around said axis materially less than the width of the exposure aperture around the axis, whereby a filter when adjusted over the exposure aperture will intercept the exposure light flux during only a portion of the exposure period and the effective portion of the filter will effect a selected color balance on the exposed color sensitive films.

10. A color balancing shutter for a camera, according to claim 9, and means to accurately gage the extent of that portion of the filter disposed across the exposure aperture.

11. A color balancing shutter for a camera for use in simultaneously making a plurality of color exposures by a single light flux on a plurality of color sensitive films, comprising a rotary shutter formed with an unobstructed exposure aperture, a pair of filters for selective color balancing, one of a color complementary to the color of the other, and means supporting said filters for rotation with the shutter and for individual and variable adjustment to dispose across the exposure aperture to the necessary extent that filter which in color is complementary to the color it is desired to obstruct, each of said filters being of such an area that in maximum effective adjustment it would obstruct only a small part of the exposure aperture, whereby a filter when adjusted over the exposure aperture will intercept the exposure light flux during only a portion of the exposure period and the effective portion of the filter will effect a selected color balance on the exposed color sensitive films.

12. A color balancing shutter for a camera for use in simultaneously making a plurality of color exposures by a single light flux on a plurality of color sensitive films, comprising a rotary shutter formed with an unobstructed arcuate exposure aperture, the shutter being opaque except for the exposure aperture, a pair of filters for selective color balancing, one of a color complementary to the color of the other, and means adjustably mounting one of said filters adjacent each end of the exposure aperture to rotate with the shutter and to be variably adjusted across the adjacent end of the said aperture or entirely out of register with said aperture and over the opaque part of the shutter, each filter being of a width around the shutter axis materially less than the width of the exposure aperture around the said axis, whereby that filter which in color is complementary to the color it is desired to obstruct may be disposed across the exposure aperture to the necessary extent to intercept the exposure light flux during the selected portion of the exposure period to effect the color balance on the exposed color sensitive films.

13. A color balancing shutter for a camera for use in simultaneously making a plurality of color exposures by a single light flux on a plurality of color sensitive films, comprising a rotary shutter formed with an arcuate exposure aperture, a pair of interchangeable color filters for selective color balancing, one of a color complementary to the color of the other, a carrier rotatively adjustable on the shutter, and means for attaching the said color filters to said carrier for interchange in use and by the rotation of the carrier to adjust across the exposure aperture to the necessary extent one filter which in color is complementary to the color it is desired to obstruct, the other filter of the pair being displaced and inoperative, each filter being of a width around the axis of the shutter materially less than the width of the exposure aperture around said axis, whereby a filter when adjusted over the exposure aperture will intercept the exposure light flux during only a portion of the exposure period and the effective portion of the filter will effect a selected color balance on the exposed color sensitive films.

14. Color photography apparatus comprising means for supporting a plurality of negative bases for simultaneous exposure to single light flux to record one color of a scene upon one base and a complementary color of the same scene upon another base, a rotary shutter operable to intercept the said light flux and having an unobstructed exposure aperture, a color-balancing filter for obstructing a complementary color, a carrier for said filter, and means supporting said carrier on the shutter for rotation therewith and for adjustment around the axis of the said shutter to dispose the filter varying degrees across the exposure aperture to obstruct to variable extents the color complementary to the color filter, and entirely out of register with said exposure aperture to render said filter ineffective, said filter being smaller in area than said aperture and of such an area that in maximum effective adjustment it would obstruct only a small part of the exposure aperture.

FREDERICK T. O'GRADY.